United States Patent
Schalk et al.

(10) Patent No.: US 6,922,669 B2
(45) Date of Patent: Jul. 26, 2005

(54) KNOWLEDGE-BASED STRATEGIES APPLIED TO N-BEST LISTS IN AUTOMATIC SPEECH RECOGNITION SYSTEMS

(75) Inventors: Thomas B. Schalk, Plano, TX (US); Roger S. Zimmerman, Wellesley, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 8 days.

(21) Appl. No.: 09/222,073

(22) Filed: Dec. 29, 1998

(65) Prior Publication Data

US 2003/0154075 A1 Aug. 14, 2003

(51) Int. Cl.[7] .............................................. G10L 15/10
(52) U.S. Cl. ........................ 704/255; 704/243; 704/251
(58) Field of Search ................................ 704/251–255, 704/257, 231, 232, 236, 243, 244, 245

(56) References Cited

U.S. PATENT DOCUMENTS

| | | | | |
|---|---|---|---|---|
| 4,866,778 A | * | 9/1989 | Baker | 704/254 |
| 4,882,757 A | * | 11/1989 | Fisher et al. | 704/253 |
| 5,119,416 A | * | 6/1992 | Ortel | 379/213 |
| 5,222,187 A | | 6/1993 | Doddington et al. | |
| 5,241,619 A | * | 8/1993 | Schwartz et al. | 704/200 |
| 5,267,345 A | * | 11/1993 | Brown et al. | 704/255 |
| 5,276,741 A | * | 1/1994 | Aragon | 382/229 |
| 5,606,644 A | * | 2/1997 | Chou et al. | 704/243 |
| 5,712,957 A | * | 1/1998 | Waibel et al. | 704/240 |
| 5,737,489 A | * | 4/1998 | Chou et al. | 704/256 |
| 5,903,864 A | * | 5/1999 | Gabdois et al. | 704/251 |
| 6,003,002 A | * | 12/1999 | Netsch | 704/236 |
| 6,049,768 A | * | 4/2000 | Goldbarg et al. | 704/273 |
| 6,205,428 B1 | * | 3/2001 | Brown et al. | 704/270 |
| 6,208,965 B1 | * | 3/2001 | Brown et al. | 704/246 |

* cited by examiner

Primary Examiner—Abul K. Azad

(57) ABSTRACT

A highly accurate technique for recognizing spoken digit strings is described. A spoken digit string is received and analyzed by a speech recognizer, which generates a list of hypothesized digit strings arranged in ranked order based on a likelihood of matching the spoken digit string. The individual hypothesized strings are then analyzed in order beginning with the hypothesized string having the greatest likelihood of matching the spoken string to determine whether they satisfy a given constraint. The first hypothesized string in the list satisfying the constraint is selected as the recognized string.

10 Claims, 1 Drawing Sheet

US 6,922,669 B2

KNOWLEDGE-BASED STRATEGIES APPLIED TO N-BEST LISTS IN AUTOMATIC SPEECH RECOGNITION SYSTEMS

BACKGROUND OF THE INVENTION

1. Technical Field

The present invention relates generally to automatic speech recognition (ASR) and, more particularly, to recognition of spoken alphabet and alpha-numeric strings using knowledge-based strategies applied to a list of hypothesized recognition results.

2. Description of the Related Art

ASR is used for various recognition tasks, including recognizing digit strings spoken by telephone callers. These digit strings typically represent credit card numbers, telephone numbers, bank account numbers, social security numbers and personal identification numbers (PIN).

Speech recognition is an imperfect art. Achieving high accuracy is difficult because multiple variables typically exist including, e.g., differences in microphones, speech accents, and speaker abilities. Recognizing spoken digit strings is particularly difficult because individual digits are short in duration, have a high degree of inter-digit acoustic confusibility, and are often co-articulated with adjacent digits. When digit-string (and alphabet or alpha-numeric) recognition is performed over a telephone network, the task is even more difficult, owing to the noise and bandwidth limitations imposed on the speech signal. Recognizing a string of spoken digits correctly requires that each digit be recognized accurately. Recognizing strings of spoken digits at high accuracy requires per-digit accuracies that are extremely high—in excess of 99%. The state of the art over-the-telephone digit recognition attempts to achieve about a 98% per-digit accuracy. Alphanumeric recognition over-the-telephone is even more difficult, with state-of-the-art recognition accuracy around 75% per character.

There is thus a need for a more accurate digit recognition technique, particularly for recognizing spoken digit strings over a telephone network.

BRIEF SUMMARY OF THE INVENTION

A primary object of the invention is to provide a method and apparatus for high accuracy recognition of spoken digit strings.

A more particular object of the invention is to provide new techniques for recognizing spoken digit strings, preferably using knowledge-based strategies applied to a list of hypothesized digit strings.

It is still another more general object of this invention to implement various knowledge-based strategies for controlling a speech recognizer.

These and other objectives are accomplished by a method and system for recognizing spoken digit strings. In accordance with a preferred embodiment of the invention, a spoken digit string is analyzed by a speech recognizer, which generates a list of hypothesized digit strings arranged in ranked order based on a likelihood of matching the spoken digit string (referred to herein as the "N-best list"). The individual hypothesized strings are then analyzed to determine whether they satisfy a given constraint, beginning with the hypothesized string having the greatest likelihood of matching the spoken string. The first hypothesized string in the list satisfying the constraint is selected as the recognized string.

Various types of constraints may be used to validate the hypothesized digit strings including, e.g., checksum constraints, valid data string matching constraints, and the like.

In accordance with further embodiments of the present invention, if none of the hypothesized digit strings in the N-best list satisfies the specified constraint, alternative verification techniques can be applied to determine the correct digit string.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawing in which.

DETAILED DESCRIPTION OF THE PREFERRED EMBODIMENT

Figure 1:
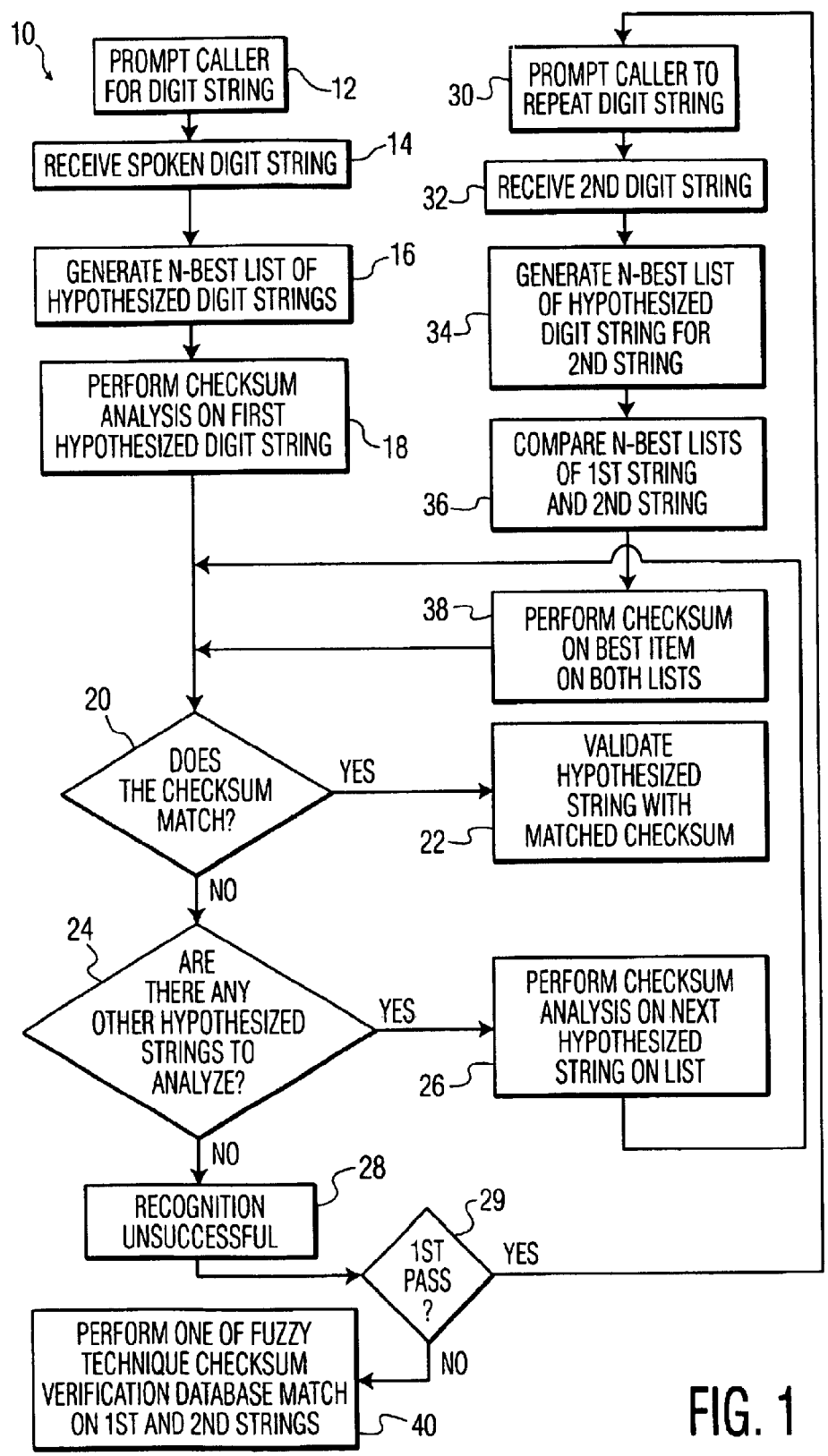
FIG. 1 is a flowchart illustrating a technique for recognizing a spoken digit string in accordance with the invention.

As discussed above, the present invention is directed to a robust method and system for accurately recognizing spoken digit strings. According to the present invention, the inventive technique may be used within or as an adjunct to a known digit recognizer or recognition engine. The digit recognizer or recognition engine receives a spoken input string and generates multiple recognition hypotheses for each spoken digit string. This is a known function that is available from several prior art systems (namely, recognition systems, applications and the like) including, without limitation, the Vpro/Continuous speech recognition engine, the VR/Continuous Speech Recognition engine, and the SpeechWave Standard speech recognition product, all currently developed and marketed by VCSI. In general, any speech recognition engine that employs a Viterbi beam-search technique can be configured to supply multiple-hypotheses in this manner. Other techniques for supplying multiple digit string hypotheses are also well known in prior art. As is well-known, the hypothesized digit strings are arranged in a rank-ordered fashion based on a likelihood of matching the spoken digit string (the N-best list). In accordance with the invention, this multi-choice feature is used in conjunction with various knowledge based recognition strategies to accurately recognize the spoken digit string.

Briefly, the inventive technique preferably analyzes the recognizer's first choice digit string (i.e., the first item in the probability sorted N-best list) to determine whether the first choice satisfies a given knowledge-based recognition constraint. If the constraint is satisfied, then that digit string is validated, i.e., it is declared to be the correct number. If the first choice does not satisfy the constraint, the recognizer's second choice is considered, and so forth, until a valid digit string is found.

If none of the hypothesized digit strings meet the constraint, then a rejection is declared, and the caller may be asked to repeat the digit string for a new analysis. Alternately, as will be described below, additional (or supplemental) verification techniques are used to determine the correct digit string.

FIG. 1 generally illustrates the inventive recognition process 10. First, at step 12, a user (who may be a telephone caller) is prompted to provide a spoken digit string such as, e.g., a credit card number. The system receives the spoken digit string at 14. The digit recognizer then analyzes the spoken digit string at step 16 and generates a rank ordered list of hypothesized digit strings (the N-best list) based on the level of confidence it has in recognizing the spoken string. The hypothesized digit strings in the list are arranged in ranked order from the most likely to the least likely correct match to the spoken string. As discussed above, this is a known functionality. Then, at step 18, the first hypothesized string in the list is analyzed. If the string satisfies a given constraint at step 20, then the hypothesized string is validated at 22 (i.e., it is selected as being the correctly recognized string). If the constraint is not satisfied, then a determination is made as to whether there are any other hypothesized strings on the list at step 24. If so, then the next string on the list is examined at step 26. The process then goes to step 20 and repeats the subsequent steps until the constraint is satisfied. If none of the hypothesized strings on the list satisfy the constraint, then the recognition process will then be deemed to have been unsuccessful at 28, and the process can optionally return to step 12 to ask the telephone caller to repeat the spoken digit string. Alternately, after step 28 in steps 30 and 32, other verification techniques (described below) can be applied to determine the correct digit string.

According to one feature of the present invention, various types of knowledge-based strategies are applied to the N-best list to validate hypothesized digit strings.

Checksums

For example, one knowledge-based strategy is a checksum approach. Using a checksum strategy, each hypothesized digit strings in the sorted N-best list is analyzed until a hypothesized digit string that correctly checksums is found. This hypothesized digit string is then verified as the answer.

As is known, checksum schemes are frequently used with various kinds of numeric data including, e.g., credit-card numbers, bank-account numbers, and other kinds of account numbers. For purposes of illustration, a credit card number is used as an example of a recognition task where the checksum strategy is applied.

In general, credit card numbers are comprised of a fixed number of digits, typically fifteen or sixteen. The last digit of the credit card number is referred to as the checksum digit. The checksum digit represents a mathematical combination of the other digits in the credit number. Various known checksum algorithms can be utilized.

Another checksum algorithm known as the Luhn checksum algorithm is commonly used for credit card numbers. The Luhn checksum is calculated as follows: For a card with an even number of digits, every odd numbered digit is doubled, and nine is subtracted from the product if the product is greater than 9. The even digits as well as the doubled-odd digits are then added. The result must be a multiple of 10 or the number is not a valid card number and is rejected. If the card has an odd number of digits, the same addition is performed, but with the doubling of the even numbered digits instead.

Using a checksum strategy together with the N-best list to validate a credit card number dramatically improves recognition accuracy. For example, recognizing credit card numbers without using checksum information will yield string accuracies of about 75% under typical conditions. Under the same conditions, recognizing credit card numbers using the N-best list and the checksum information yields accuracies of about 95%. Moreover, the "false acceptance" rate for this task (i.e., where the recognizer returns a checksum conforming result that is incorrect) is extremely low, usually less than 1%. The remaining errors (around 4% of the total) are rejections, requiring the application to reprompt or fallback to human intervention. For most applications, rejection errors are preferable to false acceptances.

Database Match

Another knowledge based strategy is matching to a database. Many applications of digit-string recognition (e.g., postal codes, license plates, catalog sales, electric-utility account information systems) have access to databases that list the valid entries. Accordingly, the N-best list can be screened in a very similar fashion to using the previously described checksum strategy, except that the acceptance criterion preferably is now an exact match to an item in the database. Because many of these databases are constructed in order to reduce the likelihood that typing errors will cause the wrong account to be accessed, this knowledge based strategy is a very powerful tool for processing the N-best list. Moreover, the database strategy is also useful for alphabet strings.

While it is possible to "precompile" such databases into a "grammar"—and therefore apply the database constraints before the recognition—this is often impractical because the databases change frequently, making continual recompilation necessary. Also, when the databases are large, grammar-recompilation can be very time consuming. As such, verifying the N-best list against the database, for example, by using fast matching techniques known in the prior art, is often the only practical way to apply such constraints.

Another application of the database-match technique is particularly suited for use with PIN numbers, e.g., in voice-controlled voicemail systems or voice-controlled banking applications. In these applications, it is known that the user inputs both an account number and a PIN number as a security measure. The following are examples of two ways of using the N-best screening technique here.

First, the technique is applied only to the PIN number. Assuming the account number is correct, there is usually some database lookup of the account number where the PIN number can be accessed. In such case, each item of the N-best list may be checked to see if it matches the PIN number to approve the entry. The ASR part of the application need not "know" explicitly what the PIN number is. All that is required is a string-match at some point in the N-best screening process. The actual PIN number can be discarded to preserve security.

Second, the technique may be applied to the account number and PIN number concurrently. In this case, the N-best lists for both the account number and PIN number recognitions are kept. Each account number hypothesis is looked up in the database to access the associated PIN number. If there is no match on the account number (or no "fuzzy" match, a technique described below), then this account number is rejected. If there is an account number match, then a subsequent match is performed on the PIN number against the N-best list for that utterance. This process can be repeated until the best possible combined match of account number and PIN number is achieved.

An advantage of the database verification technique (for the N-best list) is that it can be applied to alphabet string recognition and alphanumeric string recognition as well as pure digit string recognition. (Checksum verification can also be applied this way by assigning a numerical value to the alphabet characters.)

Digit Positional Constraints

If there are positional constraints on digits (or alpha characters), the answers in the N-best list can be checked to verify that these constraints are met. Answers that do not obey these constraints may be rejected. While it is possible to apply these constraints before the recognition, for example, by using digit "micro-grammars," this is sometimes not practicable. In these circumstances, these grammar constraints can be beneficially applied to the N-best list.

Digit String Length Constraints

Similarly, digit-string (or alphabetic-string or alphanumeric-string) length constraints can be applied to the N-best list scheme. Again, it is possible to apply these constraints at recognition time, but sometimes this information is not available or needs to be hidden for security reasons, e.g., when verifying PIN numbers. In these cases the N-best list can be screened for items conforming to known length constraints.

Supplemental Techniques

In certain circumstances, the knowledge based recognition strategy does not generate a match to one of the entries of the N-best list. In such case, it may be desirable to supplement the knowledge-based strategy. The present invention also contemplates the use of such supplemental techniques if necessary.

Thus, for example, assume that none of the N-best list choices match any entries in the database being searched (in the exact database matching technique described above). In that event, a supplemental technique, such as a "fuzzy" matching scheme, is applied. As is well-known, this technique does not require an exact database match. Instead, each answer of the N-best list is compared in a "fuzzy" manner to the database of valid numbers (or alphabetic or alphanumeric strings).

The fuzzy matching criterion may be any of a number of standard techniques, mostly involving well-known dynamic-programming algorithms. For example, the Levenshtein distance algorithm (see: Sankoff, D. and Joseph B. Kruskal, "Time Warps, String Edits and Macromolecules: The Theory and Practice of Sequence Comparison," pp. 18–21, Addison-Wesley, 1983) may be applied. In this algorithm, one string is "matched" against another by determining the sequence of substitutions, deletions, and insertions required to "transform" one string into the other. The "distance" between the two strings is the minimum number of such "corrections" (substitutions+deletions+insertions) required to perform the transformation.

A "weighted" version of the Levenshtein algorithm may also be applied, in which certain corrections are deemed to "cost" more than others. For example, when performing digit recognition in noisy conditions, it is common for the ASR algorithm to "insert" some digits—such as "oh" and "eight"—as hypotheses. A weighted matching algorithm may therefore decide to penalize such insertions less than other classes of insertions, and/or substitutions and deletions. In this way, the particular limitations of the ASR technology can be accounted for in order to achieve more robust database-matching.

This approach also applies to alphabetic and alphanumeric recognition. For alphabet recognition the "weighted" matching criterion can be very useful as there are certain sets of characters that are often very confusing to ASR systems. For example, it is difficult for state-of-the-art ASR algorithms to distinguish among the "E-set" (b, c, d, e, g, p, t, v) of alphabet characters, especially in band-limited conditions such as those typically found in telephone networks (both fixed and wireless). In this case, the Levenshtein distance can be modified to penalize substitution modes among these characters less than the other error modes.

Variants

In accordance with a further embodiment of the invention, the N-best results from two recognition attempts can be intelligently combined to ascertain the actual spoken string. With this "2-utterance" or "repeated utterance" technique, the following procedure preferably is followed:

a) The user is prompted for a number (or alphanumeric string) once.

b) The recognition is run on the spoken utterance using the digit recognizer, and the N-best list is obtained ("LIST 1").

c) Next, the digit recognizer's "confidence" measure is used to approve or reject the top answer in the N-best list. If the confidence level is sufficiently high, the utterance is accepted. However, if the confidence-level is below a given threshold, the user is prompted to repeat the string.

d) The recognition is then run on the repeated utterance, and another N-best list is obtained ("LIST 2").

e) Next, LIST 1 is used as a "database" in order to verify one of the hypotheses in LIST 2 using the database matching or fuzzy matching approaches described above. In effect, the first hypothesis in LIST 2 that also occurs in LIST 1 is selected. Alternately, the checking order can be reversed, i.e., the first hypothesis in LIST 1 that also occurs in LIST 2 can be selected. If using the fuzzy technique, the item in LIST 2 that best matches a hypothesis in LIST 1 (or visa versa) is selected.

In accordance with yet another embodiment of the invention, if none of the hypothesized digit strings are found to satisfy a specified constraint (e.g., checksum, database match, etc.), then a further verification can be applied. With this technique, the N-best list is used as a means to generate other hypotheses, which are then analyzed to determine if they satisfy the given constraint. For example, suppose you N-best list contains the following three hypotheses:

(1) 1 2 3 4 5
(2) 4 2 3 4 5
(3) 1 2 3 1 5

Then, by combining information from these three choices, it is reasonable to hypothesize the string "4 2 3 1 5" as an alternative. Even though "4 2 3 1 5" does not appear in the N-best list, it can be "synthesized" by observing the 4->1 "close call" in the fourth position of hypotheses (1) and (3), and the 1->4 close call in the first position of hypotheses (1) and (2). (All of the other permutations of these confusion modes already exist in the N-best list.) This generated string can be checksumed or otherwise analyzed to determine if it satisfies the specified constraint.

The hypothesis-generation technique can also be applied to the repeated utterance technique described above by combining the N-best lists from both recognitions (i.e., LIST 1 and LIST 2) into a single N-best list. Then, the hypothesis-generation technique is applied. The combined lists provide richer possibilities for permutations.

The digit recognition algorithms in accordance with the invention preferably comprise software, and thus one of the preferred implementations of the invention is as a set of instructions (program code) in a code module resident in the random access memory of a general purpose computer. Until required by the computer, the set of instructions may be stored in another computer memory, e.g., in a hard disk drive or in a removable memory such as an optical disk (for eventual use in a CD ROM) or a floppy disk (for eventual use in a floppy disk drive), or downloaded via the Internet or some other computer network. In addition, although the various methods described are conveniently implemented in a computer selectively activated or reconfigured by software, one of ordinary skill in the art would also recognize that such methods may be carried out in hardware, in firmware, or in more specialized apparatus or devices constructed to perform the required method steps.

A representative computer on which the inventive operation is performed has a processor (e.g., Intel-, PowerPC®- or RISC®-based), random access or other volatile memory, disc storage, a display having a suitable display interface, input devices (mouse, keyboard, and the like), and appropriate communications devices for interfacing the computer to a computer network. Random access memory supports a computer program that provides the functionality of the present invention.

Having thus described our invention, what we claim as new and desire to secure by Letters Patent is set forth in the following claims.

What is claim is:

1. A method of recognizing a spoken digit string, comprising:
   (a) receiving the spoken digit string;
   (b) analyzing the spoken digit string to generate a list of hypothesized digit strings arranged in ranked order based on a likelihood of matching the spoken digit string;
   (c) determining whether individual hypothesized strings of aid list satisfy a given constraint, using a given knowledge based recognition strategy;
   (d) selecting the first string in the list satisfying the constraint as the recognized string, if none of the hypothesized digit strings satisfy the constraint,
   (e) prompting entry of a repeated spoken digit string, which is a an entire repeat of the spoken digit string entered in step (a);
   (f) analyzing the repeated spoken digit string to generate a second list of hypothesized digit strings arranged in ranked order based on a likelihood of matching the repeated spoken digit string;
   (g) selecting the recognized string in accordance with a comparison of the first and second list if the constraint is satisfied;
   (h) using the first list as a first list database to verify one of the hypothesized strings in the second list;
   (i) selecting the recognized string in the second list that was verified by the first list; or
   (j) if there is no recognized string in the second list verified by the first list, then performing additional verification techniques to determine the correct digit string until the constraint is satisfied, and then subsequently selecting the correct digit string, wherein said additional verification techniques include performing a least one of a checksum approach with the N-best list and a personal identification number, a database match comparison with valid entries, digit positional constraints and fuzzy matching criterion.

2. The method of claim 1 wherein said given knowledge based recognition strategy comprises a database matching scheme.

3. The method of claim 2, wherein step (c) comprises searching a valid data strings database to determine whether any of the hypothesized digit strings match one of the valid digit strings.

4. The method of claim 1 wherein the knowledge based recognition strategy is a checksum scheme.

5. The method of claim 4 wherein the spoken digit string includes a checksum digit, and wherein step (c) comprises calculating a checksum of the hypothesized digit strings and determining whether the checksum matches the value of the checksum digit.

6. The method of claim 4 wherein the checksum scheme utilized a Luhn checksum algorithm.

7. The method of claim 1 wherein the knowledge based recognition strategy is a digit positional strategy and the constraining is a given digit position.

8. The method of claim 1 wherein the knowledge based recognition strategy is a digit string length strategy and the constraint is a given digit string length.

9. The method of claim 1 further comprising the step of prompting entry of a spoken digit string prior to its receipt in step (a).

10. The method of claim 1, wherein step (h) further comprises
   (ii) if there is no recognized string verified in step (i), then using the second list as a database to verify one of the hypothesized strings in the first list; and
   (iii) selecting the recognized string in the second list that was verified by the first list.

* * * * *